J. B. FURBER.
ADVERTISING DEVICE.
APPLICATION FILED JAN. 21, 1915.
1,140,148.
Patented May 18, 1915.
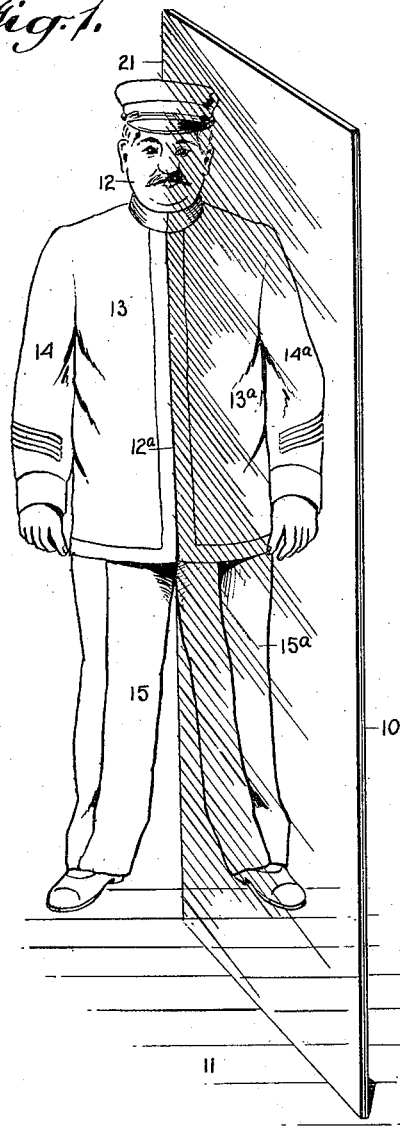
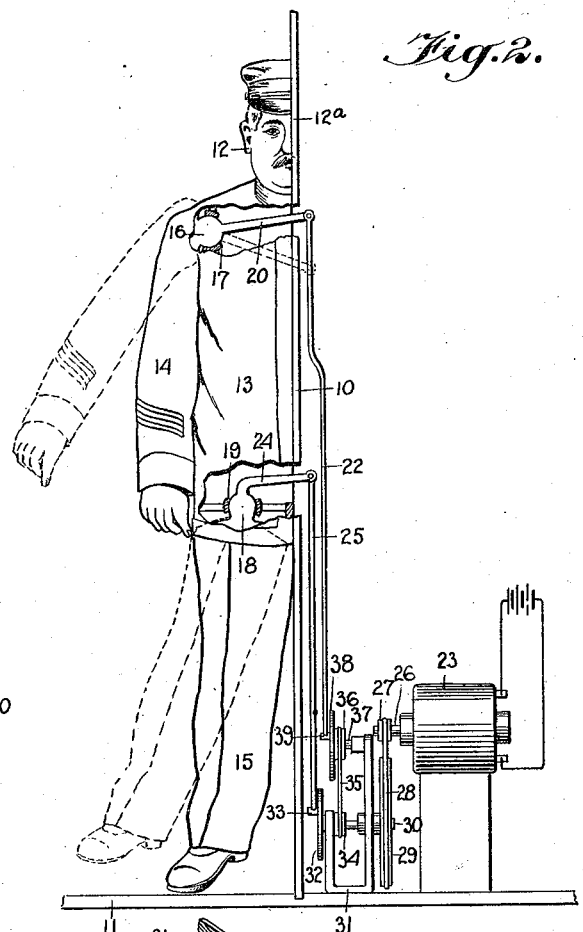
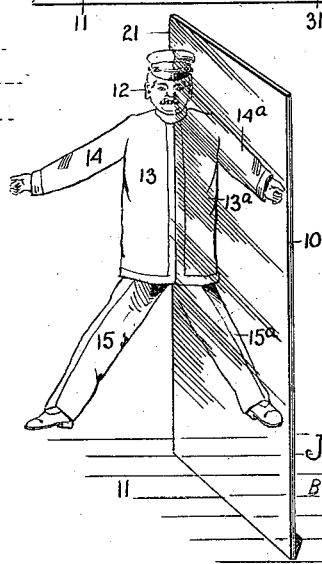
WITNESSES
INVENTOR
James B. Furber
BY
ATTORNEYS ic
UNITED STATES PATENT OFFICE.

JAMES B. FURBER, OF RAHWAY, NEW JERSEY.

ADVERTISING DEVICE.

1,140,148.  Specification of Letters Patent. Patented May 18, 1915.

Application filed January 21, 1915. Serial No. 3,560.

*To all whom it may concern:*

Be it known that I, JAMES B. FURBER, a citizen of the United States, and a resident of Rahway, in the county of Union and State of New Jersey, have invented a new and Improved Advertising Device, of which the following is a full, clear, and exact description.

My invention relates to an illusive advertising device to be displayed in a store window.

The invention involves the use of a manikin representing a half figure, with movable members such as a leg and an arm, the manikin having concealed support and a mirror being so associated with the manikin that the latter and its reflection will present a complete figure. Illusive effects are produced with respect to the apparently unsupported manikin and the movements imparted to the leg or arm thereof, the illusion being produced through the medium of the mirror and motor driven actuating devices at the back of the mirror.

The invention will be particularly explained from the specific description following.

Reference is had to the accompanying drawings forming part of this specification, in which similar characters of reference indicate corresponding parts in all the views, and in which:

Figure 1 is a perspective view of an advertising device constructed in accordance with my invention; Fig. 2 is a front elevation, parts being broken away, the view illustrating one form of actuating mechanism which may be employed; and Fig. 3 is a view similar to Fig. 1, but on a smaller scale, and indicating movable parts of the manikin in positions different from those of Fig. 1.

In constructing a practical embodiment of my invention, in accordance with the illustrated example, a mirror 10 is disposed vertically, and in practice it is positioned at right angles, or approximately at right angles with the window glass of a show window (not shown) and with the front edge of the mirror disposed against the window pane, or in close relation thereto.

The numeral 11 indicates conventionally the floor of a window.

In connection with the mirror I employ a manikin designated generally by the numeral 12, said manikin representing a half figure and having a vertical side edge $12^a$. The manikin and the mirror are disposed in transecting planes, the said vertical side edge $12^a$ of the manikin being in close juxtaposition to the face of the mirror 10, so that the mirror will reflect the manikin, and the combined manikin and its reflection will present a complete figure, as clearly indicated in Figs. 1 and 3, in which $13^a$, $14^a$, $15^a$ designate the reflections of the corresponding parts of the manikin.

The torso 13 of the manikin has movably supported thereon a vertically rockable arm 14 and a vertically rockable leg 15. I have illustrated as an example one motor-driven means that may be employed for giving movements to the arm 14 and leg 15. In the illustrated construction the arm 14 has a rounded member 16 seated in a socket 17 in the torso. Similarly, a more or less rounding member 18 on the leg 15 is rockable in a socket 19 in the torso. A laterally disposed arm 20 in rigid relation with the rockable member 16 of the arm extends laterally beyond the vertical edge $12^a$ of the manikin and transversely across the back edge 21 of the mirror 10 to the back of the latter. The motor driven means to actuate the arm 20 may consist of a connecting rod 22 driven from an electric, or other approved motor 23 arranged behind the mirror. Similarly, an arm 24 rigid with the rockable member 18 of the leg 15 extends transversely across the back edge 21 of the mirror 10 to the back of the latter and has connected therewith a connecting rod 25 driven from the motor 23. The driving connections between the motor 23 and the connecting rods 22, 25, may consist of the following elements: On the motor shaft 26 is a pulley 27 over which a belt 28 runs to a driven wheel 29 on a counter-shaft 30 having bearings in any suitable device such as a frame 31. On the driven shaft 30 is a crank disk 32 having connection through its wrist pin 33 with the connecting rod 25 of the leg 15. On the driven shaft 30 is also a pulley 34, and a drive belt 35 runs over said pulley and over a pulley 36 on a shaft 37, the latter shaft having a crank disk 38 having connection through its wrist pin 39 with the connecting rod 22 of the arm 14.

It is to be understood that the manikin is to be employed to display garments, there being garments applied thereto representing one-half of a suit of clothes, for instance. The garments conceal the supporting means for the arm and leg 14, 15, and their actuating elements 20, 24. The foot of the leg 15 desirably hangs close to the floor 11 so that normally the figure will appear as if standing on the said floor. The actuating devices serve to give movements to the arm 14 and leg 15 somewhat similar to that of a jumping-jack. When the leg 15 is in the raised position, its reflection will of course appear similarly raised and both feet will be noticeably clear of the floor 11, and since the mirror as such is not apparent, the figure is seen to go through motions while without visible means of support. Thus the illusion produced will serve to make the device attractive to a person passing the window in which the device is situated. It is to be understood that the devices at the back of the mirror will in practice be concealed from view to complete the illusion.

Having thus described my invention, what I claim as new and desire to secure by Letters Patent, is:

1. An advertising device comprising a manikin representing a half figure, presenting a vertical side edge, a mirror at substantially right angles to the manikin and juxtaposed to its said vertical side edge to reflect the manikin, so that the manikin and its reflection combined present a complete figure, the said manikin having a member thereof movably mounted, actuating means at the back of the mirror to move said member, and operative connections between said actuating means and said movable member for the manikin, said connections extending transversely of the mirror.

2. An advertising device comprising a manikin representing a half figure with one leg and one arm, and presenting a vertical edge, said leg being movably mounted on the torso of the manikin, an upright mirror disposed transversely to the plane of the manikin and juxtaposed to said side edge to reflect the manikin in a way that the said manikin and its reflection present together a complete figure, and actuating means connected with the movable leg of the manikin and concealed from view by the mirror.

3. An advertising device comprising a manikin representing a half figure with one leg and one arm, and presenting a vertical edge, said leg being movably mounted on the torso of the manikin, an upright mirror disposed transversely to the plane of the manikin and juxtaposed to said side edge to reflect the manikin in a way that the said manikin and its reflection present together a complete figure, the leg of the manikin having a length to posititon the foot thereof adjacent to the bottom line of the mirror whereby to give the illusion of ground support for the figure through the medium of the foot, a leg-lifting device extending laterally from the leg beyond the vertical side edge of the manikin and transversely to the back of the mirror, actuating means at the back of the mirror, and operative connections between the said actuating means and the leg-lifting device.

4. An advertising device comprising a manikin representing a half figure with a vertical side edge, an arm and a leg pivotally mounted on the torso of the figure to rock vertically, an upright mirror juxtaposed to said side edge and disposed in a plane transecting the plane of the manikin, lateral lifting members connected respectively with the arm and leg, and extending beyond said side edge and transversely of the mirror to the back of the latter, a motor at the back of the mirror, and separate drive connections between the motor and the arm and leg.

5. An advertising device comprising a manikin representing a half figure and having a vertical side edge, a mirror disposed in a plane transecting the plane of the manikin and juxtaposed to the vertical side edge of the latter to reflect the manikin so that the latter and its reflection present a complete figure, one of the members of the manikin being movably mounted, and concealed means to move said movable members of the manikin.

In testimony whereof I have signed my name to this specification in the presence of two subscribing witnesses.

JAMES B. FURBER.

Witnesses:
FREDERIC C. RITGER,
JOHN L. HUGHES.

Copies of this patent may be obtained for five cents each, by addressing the "Commissioner of Patents, Washington, D. C."